United States Patent [19]

Richardson

[11] Patent Number: 5,265,435
[45] Date of Patent: Nov. 30, 1993

[54] VEHICLE REFRIGERATION SYSTEM

[75] Inventor: James F. L. Richardson, Conowingo, Md.

[73] Assignee: Phyllis M. Morefield, Conowingo, Md. ; a part interest

[21] Appl. No.: 999,722

[22] Filed: Dec. 31, 1992

[51] Int. Cl.$^5$ .............................................. B60H 1/32
[52] U.S. Cl. ........................................ 62/133; 62/236
[58] Field of Search ..................... 62/229, 61, 133, 236

[56] References Cited

U.S. PATENT DOCUMENTS

| | | | |
|---|---|---|---|
| 2,453,923 | 11/1948 | Mayo | 62/61 |
| 3,283,525 | 11/1966 | Fricke et al. | 62/236 X |
| 4,015,962 | 4/1977 | Tompkins | 62/236 X |
| 5,086,625 | 2/1992 | Momose et al. | 62/236 X |

Primary Examiner—William E. Wayner
Attorney, Agent, or Firm—Morton J. Rosenberg; David I. Klein

[57] ABSTRACT

A vehicle refrigeration system (100) is provided for cooling an enclosed space within a trailer (14). The vehicle refrigeration system (100) includes a compressor unit (138) operatively coupled to a condenser (142) and an evaporator (144). The compressor unit (138) includes an electric compressor motor (140) coupled to a power controller (130) for coupling motor (140) to either a primary or a secondary source of power, and cycling the compressor motor on and off responsive to a signal from a temperature sensor (22). A primary power source unit (110) includes air driven turbine generator unit (112) affixed to the tractor (12) for generating electrical power responsive to relative displacement of the vehicle (10) with respect to the ambient air (16). Air driven turbine generator unit (112) is defined by at least one air turbine (114) rotatively coupled to at least one generator (116), the generator's output being coupled to power controller (130) for energizing the compressor motor (140). When the output from air driven turbine generator unit (112) is below a predetermined value, the compressor motor is powered from a secondary power source unit (120) coupled to power controller (130). Secondary power source unit (120) includes storage batteries (122) and a battery charge controller (124) for maintaining the charge level of batteries (122). Battery charge controller (124) utilizes power from the air turbine generator unit (112) for charging, when the compressor motor (140) is cycled off, or alternately from the vehicle's engine mounted generator (24).

20 Claims, 2 Drawing Sheets

VEHICLE REFRIGERATION SYSTEM

BACKGROUND OF THE INVENTION

1. Field of the Invention

This invention directs itself to refrigeration systems for cooling enclosed areas of vehicles. In particular, this invention directs itself to refrigeration systems for use on tractor-trailer vehicles of the type having refrigerated trailers. Still further, this invention directs itself to a vehicle refrigeration system wherein the compressor motor is electrically driven. More in particular, this invention pertains to a refrigeration system having an air driven turbine generator mounted on the vehicle for providing power for the electric compressor motor responsive to relative displacement of the vehicle with respect to the ambient atmosphere. Further, this invention directs itself to utilizing a drag reducing deflector for directing air flow to rotatively displace turbine blades, and thereby drive an electrical generator for powering the compressor motor. Still further, the invention provides for a secondary source of power in the form of storage batteries which are charged by the air driven turbine generator, or alternately by the vehicle's engine mounted generator, to maintain power for the compressor motor during time periods when there is insufficient relative displacement of the vehicle with respect to the ambient atmosphere.

2. Prior Art

Vehicle mounted refrigeration systems are well known in the art. The best prior art known to the Applicant includes U.S. Pat. Nos. 2,032,572; 2,151,097; 4,315,488; 3,587,246; 3,623,332; 3,738,621; 3,894,405; 4,555,911; 4,658,597; and, 5,086,625.

In some prior art systems, such as that disclosed in U.S. Pat. Nos. 5,086,625 and 3,587,246, refrigeration systems are disclosed having air or gas driven turbines. In these systems the turbines are directly coupled to compressors for compressing the refrigerant responsive to the displacement of the gas stream past the turbine blades. However, such systems do not provide for alternate sources of driving the compressor when there is insufficient gas flow with respect to the turbine blades. Further, these systems utilize engine generated gases, as opposed to making use of the relative displacement of the vehicle with respect to the ambient atmosphere.

In other prior art systems, such as that disclosed in U.S. Pat. No. 2,151,097, there is shown a vehicle mounted cooling system incorporating intake and exhaust vents for directing air flow therethrough. However, such systems utilize the air flow for facilitating an evaporative cooling system, as opposed to rotatively driving a turbine. Still further, such systems increase the drag of the vehicle in which they are incorporated, as opposed to providing a reduction thereof or using the energy that would otherwise be used to overcome a portion of the vehicle's drag.

SUMMARY OF THE INVENTION

A refrigeration system is provided of the type having a compressor, an evaporator, and a condenser for use on a vehicle to cool an enclosed space therein. The refrigeration system includes an electric motor drivingly coupled to the refrigeration compressor and a controller having a first output electrically coupled to the electric motor for supplying power thereto. The refrigeration system further includes a primary power source unit affixed to the vehicle and having a first electrical output coupled to a first input of the controller, the primary power source unit providing generated electricity to the first electrical output responsive to relative displacement of the vehicle with respect to an ambient atmosphere. A secondary power source unit is also included in the refrigeration system. The secondary power source unit has a second electrical output coupled to a second input of the controller, the controller coupling the first electrical output of the primary source unit to the electric motor when the relative displacement of the vehicle with respect to the ambient atmosphere is above a predetermined threshold value and coupling the second electrical output of the secondary power source unit to the electric motor when the relative displacement of the vehicle with respect to the ambient atmosphere is below the predetermined threshold value.

DESCRIPTION OF THE PREFERRED EMBODIMENTS

Figure 1:
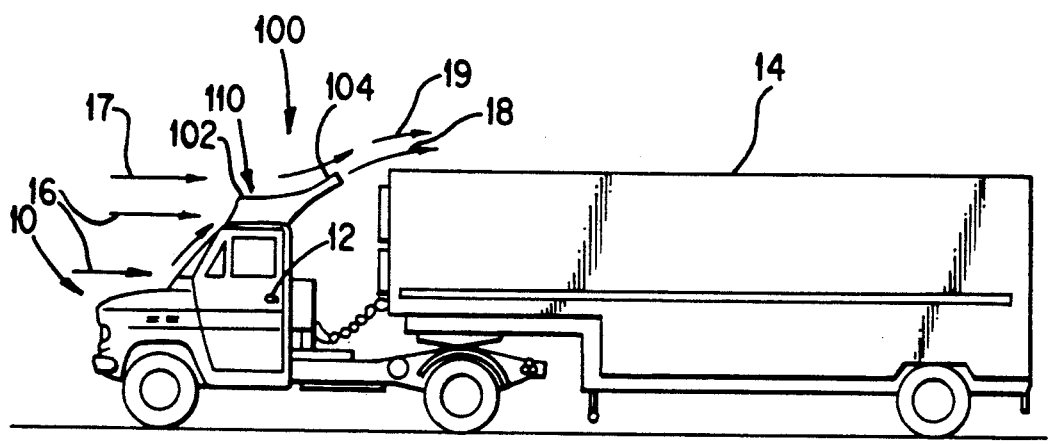
FIG. 1 is a plan view of a vehicle incorporating the refrigeration system.
Figure 2:
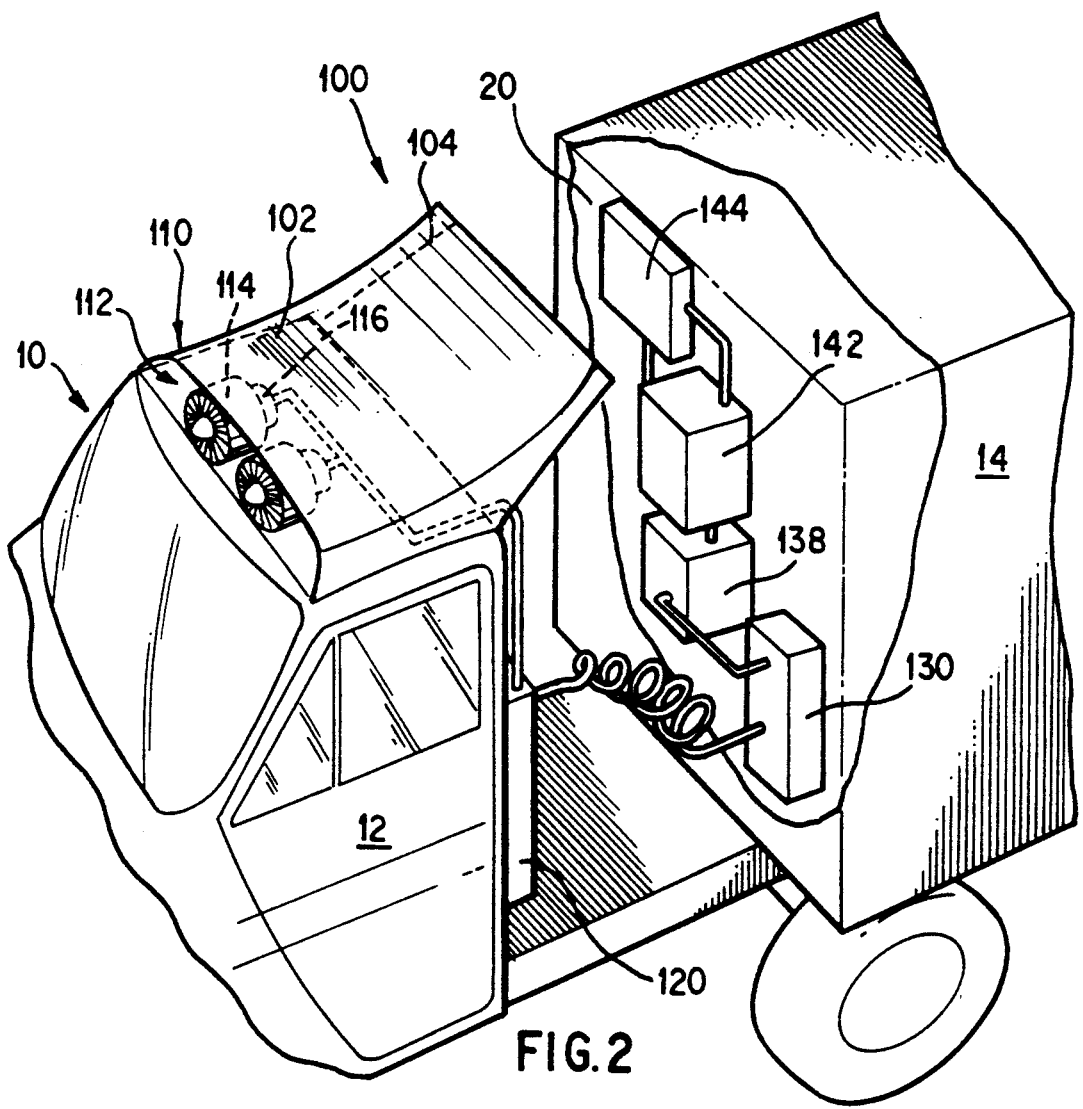
FIG. 2 is a partial perspective view of a vehicle incorporating the refrigeration system.
Figure 3:
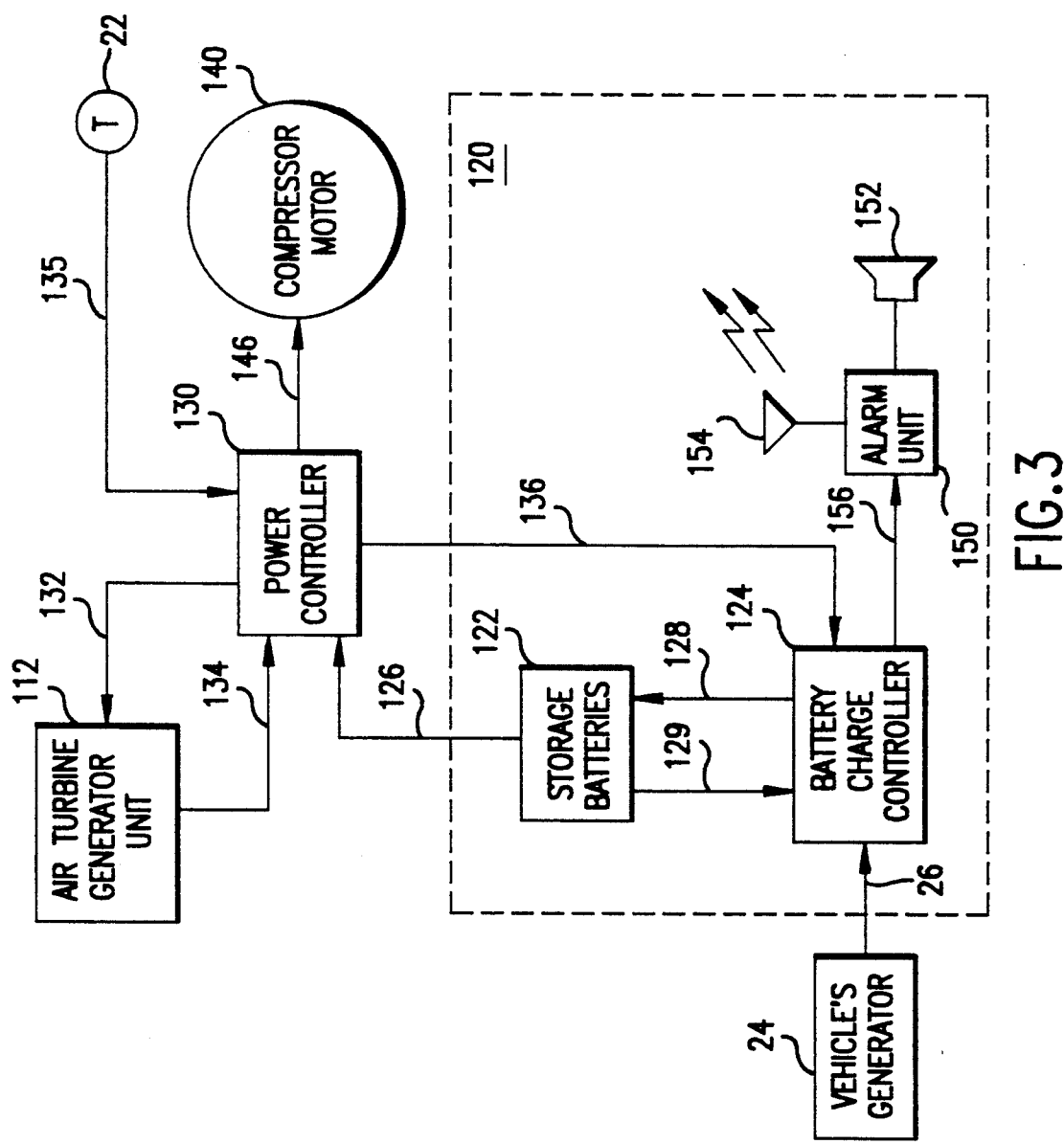
FIG. 3 is an electrical block diagram of the refrigeration system.

Referring now to FIGS. 1-3, there is shown vehicle refrigeration system 100 coupled to the vehicle 10 for cooling the enclosed space defined by the trailer 14. As will be seen in following paragraphs, vehicle refrigeration system 100 is specifically directed to the concept of generating electric power from the relative displacement of vehicle 10 with respect to the ambient atmosphere for powering an electrically driven compressor unit 138. Although not restricted to utilization on cars and trucks, vehicle refrigeration system 100 is particularly adapted for use on commercial type vehicles, such as tractor-trailers. In addition to providing a refrigeration system which is highly efficient, system 100 also serves to reduce the air resistance of tractor-trailer 10 by providing streamlined air flow over the trailer portion 14.

Referring now to FIG. 1, there is shown the tractor-trailer 10 wherein the tractor 12 tows a refrigerated trailer 14. Mounted to the roof of the cab of tractor 12 is a primary power source unit 110 defined by an air driven turbine generator unit 112 disposed within a shroud or housing 102. Thus, as vehicle 10 moves forward with respect to the ambient air 16, 17 in front of the vehicle, a portion 16 thereof is directed into shroud 102, impinging the turbine fan blades of the one or more air driven turbines 114 of turbine generator unit 112. Air exiting the turbine units 114, as well as air which flows around the air driven turbine units, is directed through the air deflection portion 104 of shroud 102, to form an exit airstream 18. A portion of the air flow 17 which passes over the shroud 102 is deflected by the external surface of the air deflection portion 104 of shroud 102 to form the airstream 19. The airstream 18 exiting from the air deflector portion 104 of shroud 102 and the airstream 19, deflected by the external surface of air deflector portion 104, together flow over the portion of trailer 14 extending above the height of the cab of tractor 12. It is thus seen that the air deflection portion 104 of shroud 102 serves to provide a streamlined air flow over the trailer 14, thereby reducing air drag of the vehicle. Therefore, the energy consumed in driving the air driven turbines 114 would otherwise have been consumed by the air drag induced by trailer 14, and since it induces less drag than the conventional tractor-trailer contour, it provides a more efficient refrigeration system in terms of fuel consumption.

As shown in FIG. 2, refrigerated trailer 14 is provided with refrigeration equipment mounted on frontal wall 20 thereof. As is conventional, a compressor unit 138 is coupled to condenser 142, the output of condenser 142 being coupled to an evaporator unit 144 for supplying liquid refrigerant thereto. Evaporator unit 144 has an output coupled to compressor unit 138 for return of refrigerant gas thereto. Compressor unit 138 is unconventional with respect to the prime mover utilized to drive the compressor, in vehicle mounted applications. Conventional compressor units utilize a small diesel engine for driving the compressor, such engines operating continuously during periods when the interior of trailer 14 must be maintained at a temperature below ambient. Although the diesel engine in these prior art refrigeration units run continuously, the compressors must cycle on and off responsive to a temperature sensor disposed within the interior of trailer 14. This is typically accomplished utilizing a clutch which disengages the compressor from the engine when the desired temperature within trailer 14 is reached. This continuous operation of the prime mover is very inefficient, as fuel is consumed without useful work being performed.

Referring additionally to FIG. 3, the compressor unit 138 of the instant invention includes a compressor which is driven by an electric motor 140. The electric motor is cycled on and off responsive to a temperature sensor 22 disposed within the interior of trailer 14. As will be described in following paragraphs, electricity generated by the air driven turbine generator unit 112 is utilized to power the compressor motor 140 under control of a power controller unit 130 only when the motor 140 is cycled on, and otherwise charges storage batteries 122. The power controller unit 130 may be mounted on the trailer wall 120, as shown, or alternately mounted on the tractor 12.

Figure 4:
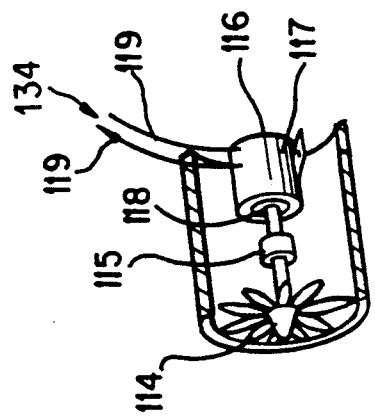
FIG. 4 is a cutaway perspective view of an air driven turbine generator unit of the refrigeration system.

Air driven turbine generator unit 112 may include one or more air driven turbines 114 for driving respective one or more generators 116. As shown in FIG. 4, the air driven turbine 114 is rotatively coupled to the rotor 118 of generator 116 by the shaft coupling 115. Thus, electrical energy is generated by the relative rotation of rotor 18 with respect to the stator 117, supplying the generated electrical power through the leads 119. Generator 116 may be a D.C. generator, providing direct current to power controller 130. Alternately, generator 116 may be an A.C. alternator, providing alternating current to power controller 130. The particular configuration of power controller 130 will depend on whether alternating or direct current is supplied from the generator unit 112, and upon the type of motor selected as compressor motor 140, A.C. or D.C. Such selections are matters of design choice well within the capability of those skilled in the art, and therefore will not be discussed herein.

Where the generator unit 116 supplies D.C. current to power controller 130 for driving a D.C. motor, power controller 130 need only regulate the voltage supplied to motor 140, to provide a substantially constant voltage over a wide range of turbine speeds. If a D.C. compressor motor 140 is selected which requires a voltage level above that which is generated by the D.C. generator 116, then power controller 130 would include a D.C.-to-D.C. converter for raising the voltage to the required level. Such D.C.-to-D.C. converters are well known in the art, converting the D.C. input to a high frequency pulsating voltage which is inductively stepped up and then rectified to provide a D.C. output. Where a generator 116 is an A.C. alternator, power controller 130 would incorporate a rectifier unit for providing a D.C. voltage to a D.C. compressor motor 140. Obviously, where an A.C. generator unit 116 is to provide power for an A.C. compressor motor 140, voltage matching can be achieved by the use of standard transformers, and power controller 130 need only additionally provide for voltage regulation. Both D.C. and A.C. voltage regulators are well known in the art, and need not be described in detail.

It is contemplated that power controller 130 would provide two-stage voltage regulation, a first stage utilizing feedback through coupling line 132 to adjust the field voltage of the generator 116 of the air turbine generator unit 112, followed by an electronic regulating circuit which provides an output on coupling line 146 to compressor motor 140, providing a substantially constant voltage over a wide range of air turbine speeds. Power controller 130 also includes a switching circuit for uncoupling the power supplied from air turbine generator unit 112 through coupling line 134 from compressor motor 140, which is supplied through coupling line 146. The switching circuit is responsive to the thermal sensor 22 disposed within the refrigerated space of trailer 14, the sensor 22 being coupled to power controller 130 by coupling line 135. Thus, the compressor of compressor unit 138 is cycled by the switching on and off of compressor motor 140.

Obviously, a vehicle is not always moving, and thus the compressor motor will not always be supplied power from air turbine generator unit 112, when such is required. Thus, a secondary power source unit 120 is provided in system 100 for providing an alternate source of power to power controller 130 through the coupling line 126. Secondary power source 120 including storage batteries 122 for use in alternately supplying power to motor 140 through power controller 130.

Power controller 130 monitors the voltage supplied to it on line 134 and transfers the load to the secondary input supplied on line 126 when the voltage from the primary power source falls below a predetermined level. The drop in voltage supplied by air driven turbine generator unit 112 below this threshold level, indicates that the relative displacement of vehicle 10 with respect to the ambient air has fallen below a threshold value, as when the vehicle slows down. The air flow threshold being defined by that level which is required to sufficiently rotate the turbine 114 to generate the minimum power for operating motor 140. Here again, power controller 130 must provide the appropriate interface between the D.C. voltage supplied from the storage batteries 122 of secondary power source unit 120 with the compressor motor 140. Depending on the type of compressor motor 140 utilized, power controller 130 will either couple the output from storage batteries 122 directly to coupling line 146, provide the coupling through a D.C.-to-D.C. converter if a higher D.C. voltage is required, or through an invertor if an A.C. voltage is to be coupled to compressor motor 140, as required.

In order to maintain storage batteries 122 sufficiently charged to take over the compressor motor load when insufficient power is generated by the air turbine generator unit 112, the secondary power source unit 120 includes a battery charge controller 124 for supplying charging voltage through coupling line 128 to storage batteries 122. Battery charge controller 124 monitors the voltage at the output of storage batteries 122, the monitored voltage being supplied to battery charge controller 124 through coupling line 129, to regulate the charging voltage supplied, as is well known in the battery charging art. Battery charge controller 124 receives power for charging storage batteries 122 from either of two sources: (1) the air turbine generator unit 112, through power controller 130, when the compressor motor 140 is cycled off, or (2) from the engine mounted generator 24 of tractor 12.

Responsive to the signal from temperature sensor 22 supplied to power controller 130 on line 135, power supplied by air turbine generator unit 112 is switched from line 146 to line 136, cutting off compressor motor 140 and supplying power for charging the storage batteries 122 through the battery charge controller 124. As required, battery charge controller 124 rectifies and/or regulates the voltage supplied on line 136, as appropriate, to provide the proper voltage for charging storage batteries 122. Thus, if the voltage supplied from power controller 130, on line 136, is an A.C. voltage, battery charge controller 124 first rectifies the voltage to provide a D.C. voltage, which then is regulated to provide a constant voltage charging of storage batteries 122. Alternately, if the voltage supplied to battery charge controller 124 through line 136 is a D.C. voltage, then such need only be regulated to the predetermined constant voltage level required to charge storage batteries 122.

When vehicle 10 has been stationary for too long a period of time, battery charge controller 124 will sense the reduced voltage output of storage batteries 122, indicating such require charging. Since air turbine generator unit 112 is not supplying voltage when the vehicle is not moving, (neglecting wind), battery charge controller 124 will sense the lack of voltage on line 136 and will couple the voltage supplied on line 26 from the vehicle's engine mounted generator 24 to supply power to augment the storage batteries 122. However, if battery charge controller 124 fails to sense voltage on line 26, as when the vehicle's engine is shut down, battery charge controller 124 enables the alarm unit 150 through the coupling line 156. Alarm unit 150 provides a signal to the annunciator 152, disposed within the cab of tractor 12 to alert the tractor-trailer operator that the vehicle's engine needs to be started in order to maintain the operation of refrigeration system 100. Further, alarm unit 150 may include a transmitter for providing a radio frequency signal through an antenna 154 to signal a remote receiver carried by the tractor-trailer operator and thereby alert him of the low battery charge condition.

Vehicle refrigeration system 100 is ideally suited for use on tractor-trailer vehicles 10 wherein the interior of the trailer 14 is to be refrigerated. Vehicle refrigeration system 100 is particularly adapted for retrofit on conventional refrigerated trailers, wherein the diesel engine prime mover is replaced by electric compressor motor 140 and the primary power source unit 110, the secondary power source unit 120 and power controller 130 are added to the existing system. The electric signal which formerly controlled the clutch of the diesel engine unit being electrically coupled to the power controller 130, or replaced with a new sensor, to establish the on and off cycle for the compressor motor 140, as previously described. The addition of the shroud 102 of primary power source unit 110 streamlines the air flow over the vehicle, reducing drag and thereby improving the fuel efficiency of the vehicle, despite the drag induced by the air driven turbine generator unit 112. Thus, a portion of the energy formerly consumed in overcoming the drag created by the portion of the trailer extending above the tractor cab is therefore utilized by system 100 to do useful work, generating power for operating the refrigeration compressor. Additionally, the fuel that was consumed by the continuously running diesel prime mover is also saved. Still further, the weight of the diesel engine, its fuel and coolant systems is considerable, and on the order of four hundred pounds is saved by its replacement with the instant invention.

Depending on the power required for the particular compressor being driven, air driven turbine generator unit 112 may be formed by multiple air turbines 114 respectively coupled to multiple generators 116, the generator outputs being paralleled to provide the required generating capacity. Further, utilizing multiple air turbines 114 and cooperating generators the contour of shroud 102 can be optimized, maximizing the utilization of the cab roof area, while minimizing the height of the opening face of the shroud 102. Although the air driven turbine generator unit 112 has been shown to be formed by an air turbine 114 rotatively coupled to the rotor 118 of a generator 116, obviously, air turbine units having integrally formed generator rotors could be utilized without departing from the inventive concept, as herein disclosed.

In broad concept, the power controller 130 supplies the electric compressor motor 140 with power from the air turbine generator unit 112, when such is sufficient, the voltage supplied therefrom being monitored for this determination. When the vehicle slows sufficiently, or stops, power controller 130 senses the reduced relative air flow by the reduced generator output, and supplies the compressor motor from the storage batteries 122 for maintaining the operation thereof. Responsive to an output from the temperature sensor 22 when the temperature of the enclosed space within trailer 14 is below a predetermined value, the power supplied from air turbine generator unit 112 is switched from compressor motor 140 to the battery charge controller 124 for charging storage batteries 122. During periods when air turbine generator unit 112 provides insufficient power for charging storage batteries 122, battery charge controller 124 utilizes the vehicle's generator 24 as the source for charging batteries 122.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as described in the appended Claims.

What is being claimed is:

1. A refrigeration system of the type having a compressor, an evaporator, and a condenser, for use on a vehicle to cool an enclosed space therein, further comprising:
   an electric motor drivingly coupled to said refrigeration compressor;
   control means having a first output electrically coupled to said electric motor for supplying power thereto;
   primary power source means affixed to said vehicle and having a first electrical output coupled to a first input of said control means, said primary power source means providing said first electrical output responsive to relative displacement of said vehicle with respect to an ambient atmosphere; and,
   secondary power source means having a second electrical output coupled to a second input of said control means, said control means coupling said first electrical output of said primary power source means to said electric motor when said relative displacement of said vehicle with respect to said ambient atmosphere is above a predetermined threshold value and coupling said second electrical output of said secondary power source means to said electric motor when said relative displacement of said vehicle with respect to said ambient atmosphere is below said predetermined threshold value.

2. The refrigeration system as recited in claim 1 where said primary power source means includes at least one electric generator affixed to said vehicle, said electric generator having a rotor and a stator.

3. The refrigeration system as recited in claim 2 where said primary power source means further includes at least one air driven turbine rotatively coupled to said rotor of said at least one electric generator for generating electricity responsive to said relative displacement of said vehicle with respect to said ambient atmosphere.

4. The refrigeration system as recited in claim 3 where said primary power source means further includes air shroud means affixed to said vehicle for directing air flow to said at least one air driven turbine.

5. The refrigeration system as recited in claim 4 where said air shroud means includes air deflection means for providing streamlined air flow over said vehicle.

6. The refrigeration system as recited in claim 2 where said at least one electric generator is a D.C. generator.

7. The refrigeration system as recited in claim 2 where said at least one electric generator is an A.C. alternator.

8. The refrigeration system as recited in claim 1 where said second power source means includes storage battery means for powering said electric motor when said relative displacement of said vehicle with respect to said ambient atmosphere is below said predetermined threshold value.

9. The refrigeration system as recited in claim 8 where said second power source means further includes means for charging said storage battery means, said charging means having a first input coupled to an engine driven generator of said vehicle.

10. The refrigeration system as recited in claim 9 where said control means includes means for electrically uncoupling said primary power source means from said electric motor responsive to a temperature of said enclosed space being below a predetermined value.

11. The refrigeration system as recited in claim 10 where said control means includes means for electrically coupling said primary power source means to a second output thereof responsive to said enclosed space temperature being below said predetermined value, said second output of said control means being coupled to a second input of said charging means for supplying power thereto.

12. The refrigeration system as recited in claim 11 where said charging means includes alarm means for indicating a concurrence of an absence of a charging voltage at said first input of said charging means and a voltage of said storage batteries being below a predetermined minimum value.

13. A refrigeration system of the type having a compressor, an evaporator, and a condenser for cooling an enclosed space within a vehicle, comprising:
   an electric motor drivingly coupled to said refrigeration compressor;
   control means having a first output electrically coupled to said electric motor for supplying power thereto;
   primary power source means affixed to said vehicle and having a first electrical output coupled to a first input of said control means, said primary power source means providing said first electrical output responsive to relative displacement of said vehicle with respect to an ambient atmosphere; and,
   storage battery means having a second electrical output coupled to a second input of said control means, said control means coupling said first electrical output of said primary power source means to said electric motor when said relative displacement of said vehicle with respect to said ambient atmosphere is above a predetermined threshold value and coupling said second electrical output of said storage battery means to said electric motor when said relative displacement of said vehicle with respect to said ambient atmosphere is below said predetermined threshold value.

14. The refrigeration system as recited in claim 13 where said primary power source means includes a plurality of electric generators affixed to said vehicle, each of said plurality of electric generators includes a rotor and a stator.

15. The refrigeration system as recited in claim 14 where said primary power source means further includes a plurality of air driven turbines, each of said plurality of air driven turbines being rotatively coupled to a rotor of a respective one of said plurality of electric generators for generating electricity responsive to said relative displacement of said air with respect to said vehicle.

16. The refrigeration system as recited in claim 14 where said plurality of electric generators are D.C. generators.

17. The refrigeration system as recited in claim 14 where said plurality of electric generators are A.C. alternators.

18. The refrigeration system as recited in claim 13 further comprising means for charging said storage battery means, said charging means having a first input coupled to an engine driven generator of said vehicle.

19. The refrigeration system as recited in claim 18 where said control means includes means for electrically uncoupling said primary power source means from said electric motor responsive to a temperature of said enclosed space being below a predetermined value.

20. The refrigeration system as recited in claim 19 where said control means includes means for electrically coupling said primary power source means to a second output thereof responsive to said enclosed space temperature being below said predetermined value, said second output of said control means being coupled to a second input of said charging means for supplying power thereto.

* * * * *